United States Patent
Suzuki et al.

(10) Patent No.: US 10,236,519 B2
(45) Date of Patent: Mar. 19, 2019

(54) FUEL CELL SEPARATOR MATERIAL AND METHOD FOR MANUFACTURING SAID MATERIAL

(71) Applicant: KOBE STEEL, LTD., Kobe-shi (JP)

(72) Inventors: Jun Suzuki, Hyogo (JP); Toshiki Sato, Hyogo (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/308,630

(22) PCT Filed: May 28, 2015

(86) PCT No.: PCT/JP2015/065484
§ 371 (c)(1),
(2) Date: Nov. 3, 2016

(87) PCT Pub. No.: WO2015/182731
PCT Pub. Date: Dec. 3, 2015

(65) Prior Publication Data
US 2017/0194657 A1    Jul. 6, 2017

(30) Foreign Application Priority Data

May 28, 2014 (JP) ................. 2014-110588
Dec. 26, 2014 (JP) ................. 2014-265269

(51) Int. Cl.
*H01M 8/04* (2016.01)
*H01M 8/0245* (2016.01)
(Continued)

(52) U.S. Cl.
CPC ............. *H01M 8/0245* (2013.01); *C23C 8/10* (2013.01); *C23C 24/08* (2013.01);
(Continued)

(58) Field of Classification Search
CPC ............. H01M 8/0245; H01M 8/0206; H01M 8/0228; H01M 8/0232; H01M 8/0234; H01M 2008/1095
See application file for complete search history.

(56) References Cited

U.S. PATENT DOCUMENTS

2003/0228510 A1    12/2003 Nakata et al.
2004/0170881 A1     9/2004 Nakata
(Continued)

FOREIGN PATENT DOCUMENTS

JP    2004-14208 A    1/2004
JP    2007-207718 A   8/2007
(Continued)

OTHER PUBLICATIONS

International Search Report dated Sep. 1, 2015 in PCT/JP2015/065484 (with English translation, previously filed).
(Continued)

*Primary Examiner* — Jane J Rhee
(74) *Attorney, Agent, or Firm* — Oblon, McClelland, Maier & Neustadt, L.L.P.

(57) ABSTRACT

A process for producing a separator material suitable for fuel cells, wherein the separator includes a pure titanium or a titanium alloy as a base material. The method comprises an application step and a heat treatment step. The application step is a step of applying a carbon black to a surface of the base material which has a carbon concentration, at a position located at a depth of 10 nm from an outermost surface, of 10 atom % or less. The heat treatment step subjects the base material, which has undergone the application step, to a heat treatment in a low-partial-oxygen-pressure atmosphere having a partial oxygen pressure of 0.0667 Pa or more and 25 Pa or less.

16 Claims, 3 Drawing Sheets

(51) Int. Cl.
| | |
|---|---|
| *H01M 8/0206* | (2016.01) |
| *H01M 8/0228* | (2016.01) |
| *C23C 8/10* | (2006.01) |
| *C23C 24/08* | (2006.01) |
| *H01M 8/0232* | (2016.01) |
| *H01M 8/0234* | (2016.01) |
| *H01M 8/1018* | (2016.01) |

(52) U.S. Cl.
CPC ....... *H01M 8/0206* (2013.01); *H01M 8/0228* (2013.01); *H01M 8/0232* (2013.01); *H01M 8/0234* (2013.01); *H01M 2008/1095* (2013.01); *Y02P 70/56* (2015.11)

(56) References Cited

U.S. PATENT DOCUMENTS

| | | |
|---|---|---|
| 2008/0160390 A1 | 7/2008 | Nakata |
| 2009/0197143 A1* | 8/2009 | Kaneko ............... H01M 8/0206 429/483 |
| 2009/0211667 A1* | 8/2009 | Suzuki ................ H01M 8/0206 148/281 |
| 2010/0035120 A1 | 2/2010 | Sato et al. |
| 2010/0151358 A1* | 6/2010 | Sato ........................ C23C 14/16 429/514 |
| 2013/0164654 A1 | 6/2013 | Suzuki et al. |
| 2015/0171434 A1 | 6/2015 | Suzuki et al. |

FOREIGN PATENT DOCUMENTS

| | | |
|---|---|---|
| JP | 2008-204876 A | 9/2008 |
| JP | 4147925 B2 | 9/2008 |
| WO | WO 2007/145377 A1 | 12/2007 |
| WO | WO 2009/034845 A1 | 3/2009 |
| WO | WO 2012/011201 A1 | 1/2012 |
| WO | WO 2014/013859 A1 | 1/2014 |

OTHER PUBLICATIONS

Written Opinion dated Sep. 1, 2015 in PCT/JP2015/065484 (with English translation).

* cited by examiner

FUEL CELL SEPARATOR MATERIAL AND METHOD FOR MANUFACTURING SAID MATERIAL

TECHNICAL FIELD

The present invention relates to a separator material for fuel cells which is made of either pure titanium or a titanium alloy, and to a process for producing thereof.

BACKGROUND ART

A fuel cell is configured as a stack by stacking a plurality of unit cells together with separators (also called bipolar plates) interposed therebetween which have grooves serving as channels for gases (hydrogen, oxygen, etc.), the unit cells each including an anode electrode, a cathode electrode, and a polymer electrolyte membrane sandwiched therebetween. The output of such a fuel cell can be heightened by increasing the number of cells per stack.

Separators for fuel cells serve also to permit the generated electric current to flow into adjoining cells. The separator materials constituting separators are hence required to have both high electrical conductivity and conductive durability which enables the high conductivity to be maintained over a long period even in the high-temperature acidic atmospheres within the cells of the fuel cells. The high conductivity and conductive durability mean that the contact resistance is low. Contact resistance means that a voltage drop occurs due to an interfacial phenomenon between the electrode and the separator surface.

Separator materials developed so as to satisfy those requirements are proposed, for example, in Patent Documents 1 to 4.

Patent Document 1 describes a separator for polymer electrolyte fuel cells which includes a metallic base material having an oxidized coating film of the base material itself formed in the surface thereof and a conductive thin film formed over the surface of the oxidized coating film, in which an interlayer for enhancing adhesion has been formed between the oxidized coating film of the base material itself and the conductive thin film, the conductive thin film being a thin carbon film constituted of carbon (C) and formed on an atomic level, and the interlayer is constituted of at least one layer of a layer (Me) constituted of one or more elements selected from among metals consisting of Ti, Zr, Hf, V, Nb, Ta, Cr, Mo, and W and among semimetallic elements consisting of Si and B, and a (carbon-Me) gradient layer which has been formed on the (Me) layer and includes carbon (C) and metallic or semimetallic element(s) (Me) and in which the proportion of carbon (C) increases as the distance from the base material increases.

Patent Document 2 describes a separator for fuel cells which includes a base material made of a metal and a surface treatment layer formed on the surface of the base material, in which the surface treatment layer includes a base material-side portion constituted of metallic or semimetallic element (Me) or a carbide of the metallic or semimetallic element (MeC) and an opposite-side portion from the base material which is either a portion constituted of carbon (C) and formed on an atomic level or a portion constituted of (C+Me or MeC) obtained by compositing carbon with metallic or semimetallic element (Me) or a carbide of the metallic or semimetallic element (MeC) on an atomic level.

Patent Document 3 describes a separator for fuel cells characterized in that it includes a metal plate whose surface has been coated with a conductive carbon film, the conductive carbon film is one formed by a chemical vapor-phase synthesis method or a sputtering method at a film deposition temperature of 400° C. to 600° C., and the conductive carbon film has a density of unpaired electrons of $10^{20}$ electrons/cm$^3$ or higher, a G/D ratio as determined by Raman spectrometry of 0.5 or less and a resistivity of 10 Ωcm or less.

Patent Document 4 describes a separator for fuel cells which includes a metallic base material and a coating layer formed thereon, characterized in that the coating layer includes an amorphous carbon layer and a conductive portion.

PRIOR ART DOCUMENTS

Patent Documents

Patent Document 1: Japanese Patent No. 4147925
Patent Document 2: JP-A-2004-14208
Patent Document 3: JP-A-2007-207718
Patent Document 4: JP-A-2008-204876

SUMMARY OF THE INVENTION

Problems that the Invention is to Solve

As stated above, separators for fuel cells are required to have high conductivity and conductive durability. However, the separators described in Patent Documents 1 to 4 have the possibility of being unable to fully satisfy the requirements because of the following concerns.

The separator for fuel cells which is described in Patent Document 1 includes an interlayer formed between the base material and the conductive thin film to thereby enhance the adhesion therebetween. However, the conductive thin film and the interlayer are ones layered by vapor-phase film deposition and, hence, there is a possibility that the interfacial adhesion between the interlayer and the conductive thin film might be low. Consequently, in the cases when this separator for fuel cells is used as fuel-cell separators, there is a possibility that troubles such as peeling between the interlayer and the conductive thin film might occur, resulting in a decrease in conductivity.

The fuel-cell separator described in Patent Document 2 includes a surface treatment layer formed on the surface of a base material, the surface treatment layer including a base material-side portion and an opposite-side portion which differ in chemical composition. However, the base material-side portion and opposite-side portion of the surface treatment layer are ones layered by vapor-phase film deposition and, hence, there is a possibility that the interfacial adhesion between these might be low. Consequently, in the cases when this fuel-cell separator is used in fuel cells, there is a possibility that troubles such as peeling between the base material-side portion and the opposite-side portion might occur, resulting in a decrease in conductivity.

The separator for fuel cells described in Patent Document 3 includes a conductive carbon film directly formed on the surface of the base material by a chemical vapor-phase synthesis method of a sputtering method. There is hence a possibility that the adhesion between the base material and the conductive carbon film might be low. Conversely, in the cases when this separator for fuel cells is used as fuel-cell separators, there is a possibility that troubles such as peeling between the base material and the conductive carbon film might occur, resulting in a decrease in conductivity.

The separator for fuel cells described in Patent Document 4 includes a carbon layer directly formed on the base material. There is hence a possibility that the adhesion therebetween might be low. Consequently, in the cases when this separator for fuel cells is used as fuel-cell separators, there is a possibility that troubles such as peeling between the base material and the carbon layer might occur, resulting in a decrease in conductivity.

An object of the present invention, which has been achieved under those circumstances, is to provide a separator material for fuel cells which has high conductivity and conductive durability and to provide a process for producing the same.

Means for Solving the Problems

The process for producing a separator material for fuel cells according to the present invention, which has overcome those problems, is a process for producing a separator material for fuel cells, the separator including a pure titanium or a titanium alloy as a base material, including an application step of applying a carbon black to a surface of the base material which has a carbon concentration, at a position located at a depth of 10 nm from an outermost surface, of 10 atom % or less, and a heat treatment step of subjecting the base material, which has undergone the application step, to a heat treatment in a low-partial-oxygen-pressure atmosphere having a partial oxygen pressure of 25 Pa or less.

In the process according to the present invention for producing a separator material for fuel cells, carbon black is applied in the application step to a surface of a base material that has a carbon concentration, at a position located at a depth of 10 nm from an outermost surface, of 10 atom % or less. As a result, titanium atoms of the base material are apt to diffuse, in the subsequent heat treatment, outward into the carbon black applied in the application step. Subsequently, in the heat treatment step, the base material is heat-treated in a low-partial-oxygen-pressure atmosphere having a partial oxygen pressure of 25 Pa or less. As a result, some or all of the titanium atoms of the base material which have diffused outward into the carbon black react with the oxygen present in a slight amount in the atmosphere and thereby become titanium oxide. Because of this, the heat-treated base material has, on the surface thereof, a mixture layer in which the carbon black and the titanium oxide yielded by the oxidation of some or all of the titanium atoms diffused outward from the base material have been mixed. The carbon black and titanium oxide contained in this mixture layer do not undergo oxidation even in the high-temperature acidic atmospheres (for example, 80° C., pH 2) within fuel cells and are stable. In this mixture layer, the carbon black portion serves as conduction paths and the titanium oxide portion exhibits corrosion resistance, thereby attaining both conductivity and corrosion resistance. Thus, the process according to the present invention for producing a separator material for fuel cells is capable of producing a separator material for fuel cells which has high conductivity and conductive durability.

It is preferable that the process according to the present invention for producing a separator material for fuel cells further includes, before the application step, a carbon concentration reduction step of subjecting the surface of the base material to a treatment so that the carbon concentration at a position located at a depth of 10 nm from an outermost surface is regulated to 10 atom % or less.

The inclusion of the carbon concentration reduction step makes it possible to regulate the carbon concentration, at a position located at a depth of 10 nm from an outermost surface, to 10 atom % or less. Namely, by this step, the region contaminated with organic and other substances adherent to the outermost surface of the base material (contaminated region) can be removed. Consequently, the bonding of the carbon black to the base material surface in the subsequent heat treatment step can be facilitated. As a result, the mixture layer in which the carbon black and titanium oxide yielded by the oxidation of some or all of titanium atoms diffused outward from the base material have been mixed can be advantageously formed on the base material surface. Consequently, the inclusion of this carbon concentration reduction step makes it possible to produce, without fail, a separator material for fuel cells which has high conductivity and conductive durability.

In the process according to the present invention for producing a separator material for fuel cells, it is preferable that the treatment in the carbon concentration reduction step is a pickling treatment of pickling the base material in an aqueous solution of a mixture of nitric acid and hydrofluoric acid.

By this treatment, the carbon concentration at a position located at a depth of 10 nm from the outermost surface can be regulated to 10 atom % or less without fail.

In the process according to the present invention for producing a separator material for fuel cells, it is preferable that the heat treatment in the heat treatment step is conducted at a partial oxygen pressure of $1.3 \times 10^{-3}$ to 21 Pa and in a temperature range of 300 to 800° C.

This makes it possible to form, without fail, the mixture layer in which the carbon black and titanium oxide yielded by the oxidation of some or all of titanium atoms diffused outward from the base material have been mixed. Consequently, the process according to the present invention for producing a separator material for fuel cells can produce, without fail, a separator material for fuel cells which has high conductivity and conductive durability.

The present invention further provides a separator material for fuel cells including a base material of a pure titanium or a titanium alloy, and a mixture layer formed on a surface of the base material and in which carbon black and titanium oxide yielded by an oxidation of some or all of titanium atoms which have diffused outward from the base material have been mixed. The separator material for fuel cells of the present invention combines high conductivity and conductive durability, due to the mixture layer.

Effects of the Invention

In the process according to the present invention for producing a separator material for fuel cells, carbon black is applied to a surface of a base material in which the carbon concentration at a position located at a depth of 10 nm from an outermost surface is 10 atom % or less, followed by heat-treating at a low partial oxygen pressure. Because of this, a separator material for fuel cells which has high conductivity and conductive durability can be produced. Furthermore, the separator material for fuel cells according to the present invention has high conductivity and conductive durability.

MODES FOR CARRYING OUT THE INVENTION

Figure 1:
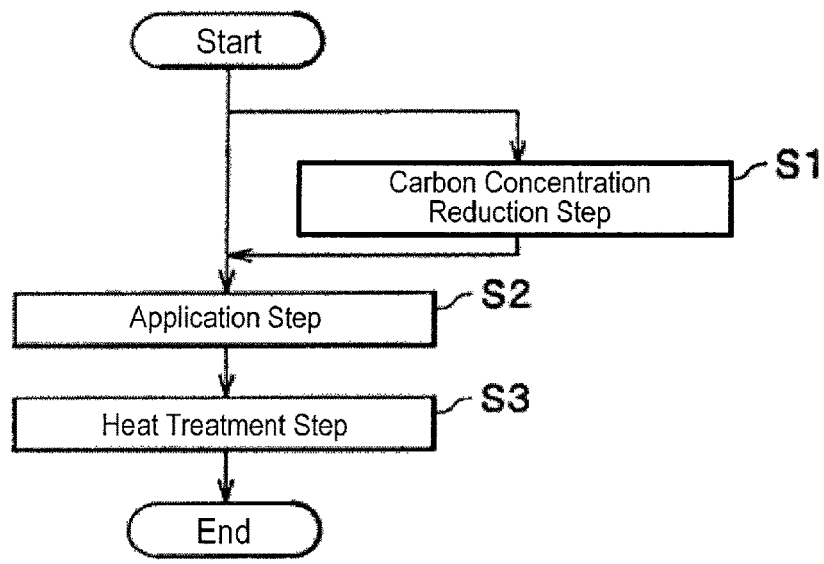
FIG. 1 is a flowchart for explaining the details of a process according to the present invention for producing a separator material for fuel cells.

One embodiment of the process according to the present invention for producing a separator material for fuel cells is explained below in detail while suitably referring to the drawings.

(Process for Producing Separator Material for Fuel Cells)

The process for producing a separator material for fuel cells, according to the present embodiment, is a process for producing a separator material for fuel cells, the separator including pure titanium or a titanium alloy as a base material (hereinafter, it is referred to simply as a "base material").

Examples of the pure titanium may include Classes 1 to 4 as defined in JIS H 4600. Examples of the titanium alloy may include Ti—Al, Ti—Nb, TiTa, Ti-6Al-4V, and Ti—Pd. However, they each should not be limited to these examples. The base material made of pure titanium or a titanium alloy can be lightweight and have excellent corrosion resistance. Furthermore, even in the cases when the surfaces of the base material include exposed portions or edge portions which are not covered with the mixture layer that will be described later, the titanium or titanium alloy does not dissolve away in the high-temperature acidic atmospheres (for example, 80° C., pH 2) within fuel cells and there is no possibility of deteriorating the solid polymer membranes.

It is preferable that the base material is a cold-worked sheet material having a thickness of, for example, 0.05 to 1 mm. In the cases when the thickness thereof is within that range, this base material satisfies the requirements concerning weight and thickness reductions in separators, has the strength and handleability as separator materials, and can be relatively easily press-formed into the shape of a separator. The base material may be in a long band form in a coiled state, or may be in a sheet-like form cut into a given size.

Figure 2:
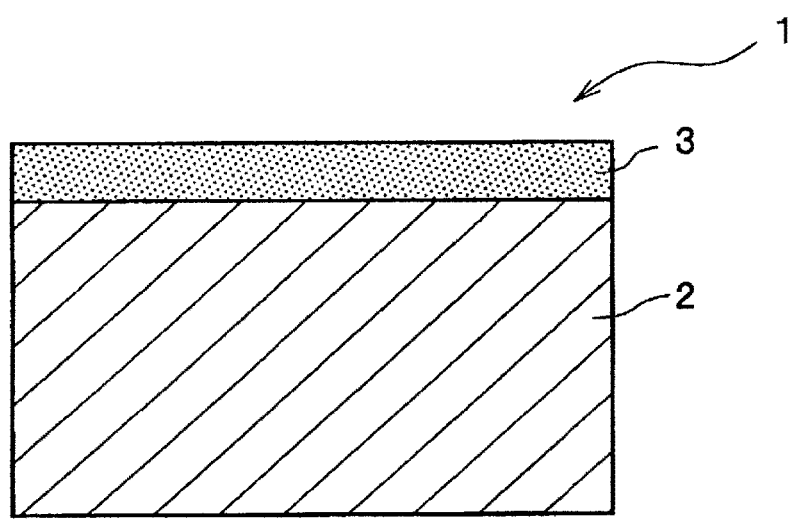
FIG. 2 is a diagrammatic cross-sectional view which illustrates the configuration of a separator material for fuel cells which has been produced by a process according to the present invention for producing a separator material for fuel cells.

FIG. 1 is a flowchart for explaining the details of a process according to the present embodiment for producing a separator material for fuel cells. As illustrated in FIG. 1, the process according to the present embodiment for producing a separator material for fuel cells includes an application step S2 and a heat treatment step S3, and these steps are conducted in this order. By carrying out the process according to the present embodiment for producing a separator material for fuel cells, the separator material 1 for fuel cells which is illustrated in FIG. 2 can be produced. This separator material 1 for fuel cells includes a base material 2 and a mixture layer 3 formed on a surface (one surface or each of both surfaces) of the base material 2. The separator material 1 for fuel cells may have a layer of carbon black, being not illustrated in FIG. 2, on the mixture layer 3. This layer of carbon black is one of the carbon black which has been used for carrying out the process according to the present embodiment for producing a separator material for fuel cells and which remains thereafter.

(Application Step)

The application step S2 is a step of applying carbon black to a surface of a base material 2 in which the carbon concentration at a position located at a depth of 10 nm from an outermost surface is 10 atom % or less. In the case where the carbon concentration at a position located at a depth of 10 nm from an outermost surface is 10 atom % or less, the average carbon concentration in the region ranging from 5 to 50 nm in terms of depth from the outermost surface is also 10 atom % or less. These two cases can hence be interchangeably used.

An explanation is given on the carbon concentration at a position located at a depth of 10 nm from an outermost surface. The carbon concentration at a position located at a depth of 10 nm from an outermost surface of a base material 2 can be measured by conducting depth-direction compositional analysis by using, for example, an X-ray photoelectron spectroscopy (XPS). Usually, carbon attributable to the adsorption of organic and other substances present in the atmosphere is detected from a surface layer of the base material 2. In the present invention, the portion obtained by removing a surface layer portion (contaminant layer) of the base material 2 onto which organic and other substances have been adsorbed is referred to as "outermost surface". In the present invention, the carbon concentration at a position located at a depth of 10 nm from that outermost surface has been regulated to 10 atom % or less. In the case where the carbon concentration at that position exceeds 10 atom %, this means that there is a high possibility that working oil and organic and other substances present in the atmosphere might have infiltrated into and contaminated a surface layer of the base material 2 during the rolling and other steps for producing the base material 2, or that these might have reacted with titanium to form titanium carbide. In the case where a surface layer of the base material 2 has been contaminated with working oil or organic and other substances or where titanium carbide has been formed, carbon black is less apt to be bonded to the surface of the base material 2 when a heat treatment is performed in the heat treatment step S3 which will be described later. Because of this, the mixture layer 3 is less apt to be formed, resulting in a possibility that high conductivity and conductive durability cannot be obtained.

It is therefore preferable that in the cases when the carbon concentration at a position located at a depth of 10 nm from the outermost surface of the base material 2 exceeds 10 atom %, the carbon concentration reduction step S1 which will be described later is performed before the application step S2 is performed. The carbon concentration reduction step S1 will be described later. Meanwhile, in the cases when the carbon concentration at that position is 10 atom % or less, the application step S2 can be performed without conducting the carbon concentration reduction step S1. By regulating the rolling process, for example, by conducting cold rolling at a rolling reduction rate per pass of 10% or less, the carbon concentration at a position located at a depth of 10 nm from the outermost surface of the base material 2 can be suppressed low and it can be 10 atom % or less. The lower the carbon concentration at a position located at a depth of 10 nm from the outermost surface of the base material 2, the more preferred. The carbon concentration at that position is preferably regulated to, for example, 9 atom % or less, and more preferably regulated to 8 atom % or less.

In the cases when it is desired to more reliably obtain high conductivity and conductive durability, it is preferred to always perform the carbon concentration reduction step S1 which will be described layer.

The application of carbon black to a surface of the base material 2 can be attained by applying a water-based or oil-based liquid (dispersion) in which a powder of carbon black has been dispersed or by directly applying a powder of carbon black. The water-based or oil-based liquid in which a powder of carbon black has been dispersed may contain a binder, surfactant, etc. However, since binders, surfactants and the like tend to reduce conductivity, it is preferable that the contents thereof are low. For the water-based liquid, water can, for example, be used as the medium. As the oil-based liquid, use can be made, for example, of ethanol, toluene, cyclohexanone, or the like.

It is preferable that the powder of carbon black has a particle diameter of 20 to 200 nm. Although carbon black powders tend to form aggregates in coating materials, it is preferred to use, in this production process, a coating material contrived so that aggregates are not formed therein. For example, it is preferred to use a coating material prepared by using a carbon black powder which has been made to have enhanced dispersibility by chemically bonding functional groups, e.g., carboxyl groups, to the carbon black surface to enhance the mutual repulsion.

As the amount of a carbon black powder to be applied to the surface of the base material 2, so long as it is, for example, 1 μg/cm$^2$ or larger, high conductivity and conductive durability can be obtained. In the cases when it is, for example, 2 μg/cm$^2$ or larger, more stable conductive durability can be obtained. An upper limit of the application amount of a carbon black powder is, for example, preferably about 50 μg/cm$^2$. Even when the application amount of a carbon black powder is increased beyond that value, not only the effect of improving conductivity and conductive durability is saturated but also an increased cost results, which is hence undesirable.

Examples of methods for applying the dispersion in which a carbon black powder has been dispersed to the base material 2 include brush application and use of a bar coater, roll coater, gravure coater, die coater, dip coater, spray coater, or the like. However, usable application methods are not limited to these. In the case of applying in a powder form, use can be made of a method in which a toner produced by using carbon black is used to electrostatically apply it to the base material.

(Heat Treatment Step)

The heat treatment step S3 is a step of subjecting the base material 2, which has undergone the application step S2, to a heat treatment in a low-partial-oxygen-pressure atmosphere having a partial oxygen pressure of 25 Pa or less. On the surface of the base material 2 which has been heat-treated in this heat treatment step S3, a mixture layer 3 is formed, in which carbon black and titanium oxide yielded by the oxidation of some or all of titanium atoms diffused outward from the base material 2 have been mixed. The formation of this mixture layer 3 can impart high conductivity and conductive durability to the separator material 1 for fuel cells. A balance between the carbon black amount and the degree of oxidation in the mixture layer 3 is important. The proportion in cross-sectional area between the titanium oxide and the carbon black is preferably such that (titanium oxide):(carbon black) is from 1:9 to 8:2 by mass ratio.

In the case where the partial oxygen pressure in the heat treatment step S3 exceeds 25 Pa, there is a possibility that a reaction between carbon and oxygen might occur to yield carbon dioxide (combustion). Namely, the carbon black suffers oxidative decomposition. Furthermore, in exposed portions where the surface of the base material 2 is exposed, titanium in the surface of the base material 2 is oxidized to yield titanium oxide in a large amount (resulting in a titanium oxide layer having too large a thickness). In addition, the mixture layer 3 in which carbon black and titanium oxide yielded by the oxidation of some of all of titanium atoms diffused outward from the base material 2 have been mixed is not formed, and it is therefore impossible to obtain high conductivity and conductive durability. It is therefore necessary that the heat treatment should be conducted at a partial oxygen pressure regulated to 25 Pa or less as stated above, by performing the treatment at a reduced pressure or by using, for example, an inert gas such as Ar gas or nitrogen gas or a mixed gas composed of any of such inert gases and oxygen.

The partial oxygen pressure is preferably in the range of, for example, $1.3 \times 10^{-3}$ to 21 Pa. The temperature for the heat treatment is preferably in the temperature range of, for example, 300 to 800° C. In the cases when the partial oxygen pressure and the temperature for the heat treatment are within the respective ranges as stated above, some or all of titanium atoms diffused outward from the base material 2 react with the oxygen present in a slight amount within the atmosphere to become titanium oxide and a mixture layer 3 in which the titanium oxide and carbon black have been mixed can be formed without fail. Namely, a layer which is not TiC can be formed. TiC is undesirable because, although it is low in contact resistance, oxidation thereof proceeds in the high-temperature acidic atmospheres (for example, 80° C., pH 2) within fuel cells and thus resistance thereof increases. In contrast, the carbon black and titanium oxide which are contained in the mixture layer 3 do not undergo oxidation even in the high-temperature acidic atmospheres (for example, 80° C., pH 2) within fuel cells and are stable. Thus, the process according to the present invention for producing a separator material for fuel cells is capable of producing a separator material 1 for fuel cells which has high conductivity and conductive durability. The upper limit of the partial oxygen pressure is more preferably, for example, 20 Pa. A lower limit of the partial oxygen pressure is more preferably, for example, 0.0667 Pa. The lower limit of the heat treatment temperature is more preferably, for example, 500° C., and the upper limit of the heat treatment temperature is more preferably, for example, 750° C. Even when the upper and lower limits of the partial oxygen pressure and the upper and lower limits of the heat treatment temperature are set at such values, the separator material 1 for fuel cells can be produced.

The period of the heat treatment can be, for example, 30 minutes in the case where the heat treatment temperature is 500° C., or can be 1 to 2 minutes in the case where the heat treatment temperature is 700° C. The period of the heat treatment is not limited to these examples, and can be suitably set in accordance with the heat treatment temperature.

In the cases when the heat treatment is conducted in an atmosphere having a low partial oxygen pressure close to $1.3 \times 10^{-3}$ Pa and under temperature conditions as low as about 400° C., there is a possibility that the formation of titanium oxide might be slightly insufficient, resulting in somewhat insufficient durability, although the conductivity is high. In such cases, use may be made of a method in which after the heat treatment is conducted at such a low partial oxygen pressure, heat-treatment in the air atmosphere is conducted to thereby accelerate the formation of titanium oxide to heighten the durability. This heat treatment in the air atmosphere may be performed under such conditions that carbon black combustion is less apt to occur and titanium oxide formation occurs. Such conditions may include, for example, 30 to 60 minutes at lower temperature side (e.g., 200° C. or higher and lower than 350° C.) in the temperature range of 200 to 500° C., and 0.5 to 5 minutes at higher temperature side (e.g., 350° C. or more and 500° C. or less) in that range. The conditions may be suitably regulated as such to perform.

As explained above, according to the process of the present invention for producing a separator material for fuel cells, carbon black is applied in the application step S2 to a surface of a base material 2 which has carbon concentration at a position located at a depth of 10 nm from the outermost surface of 10 atom % or less. Subsequently, in the heat treatment step S3, this base material 2 is heat-treated in a low-partial-oxygen-pressure atmosphere having a partial oxygen pressure of 25 Pa or less. Therefore, a mixture layer 3 in which carbon black and titanium oxide yielded by the oxidation of some or all of titanium atoms diffused outward from the base material 2 have been mixed is formed on the surface of the heat-treated base material 2 as illustrated in FIG. 2. Due to the formation of this mixture layer 3, high conductivity and conductive durability can be imparted to the separator material 1 for fuel cells. Consequently, in the cases when the separator material 1 for fuel cells which was produced by this production process is used to form a separator (not shown) and this separator is used in a fuel cell (not shown), the low contact resistance can be maintained over a long period in a cell of the fuel cell (conductive durability is high). Furthermore, since the base material 2 is titanium or a titanium alloy, there is no fear of titanium dissolution within the cell of the fuel cell, and deterioration in the performance of the polymer membrane (not shown) is not caused.

The process according to the present embodiment for producing a separator material for fuel cells is as described above. However, as described above, in the case where the carbon concentration at a position located at a depth of 10 nm from the outermost surface of the base material 2 exceeds 10 atom %, the outward diffusion of titanium atoms from the base material 2 to the carbon black is inhibited even when the heat treatment is conducted in the heat treatment step S3 and the mixture layer 3 is less apt to be formed. Consequently, in such a case, a carbon concentration reduction step S1 is conducted before the application step S2 as illustrated in FIG. 1.

(Carbon Concentration Reduction Step)

The carbon concentration reduction step S1 is a step of subjecting, before the application step S2, the surface of the base material 2 to a treatment so that the carbon concentration at a position located at a depth of 10 nm from the outermost surface is regulated to 10 atom % or less. Namely, the carbon concentration reduction step S1 is a step of removing, in an outermost-surface of the base material 2, a region which has been contaminated with organic and other substances and a region where titanium carbide has been formed.

In the cases when the carbon concentration at a position located at a depth of 10 nm from the outermost surface of the base material 2 exceeds 10 atom %, for reducing it to 10 atom % or less, it is preferred, for example, to conduct a pickling treatment of pickling the base material 2 in an acidic aqueous solution containing hydrofluoric acid. This acidic aqueous solution containing hydrofluoric acid may contain nitric acid, sulfuric acid, hydrogen peroxide, and the like alone or in combination. For example, in the case of a mixed aqueous solution of hydrofluoric acid and nitric acid, the concentration of hydrofluoric acid is preferably 0.1 to 5 mass % and more preferably, for example, 1 mass %. Meanwhile, the concentration of nitric acid is preferably 1 to 20 mass % and is more preferably, for example, 5 mass %.

For example, in the case of a mixed aqueous solution of hydrofluoric acid and hydrogen peroxide, the concentration of hydrofluoric acid is preferably 0.1 to 5 mass % and is more preferably, for example, 1 mass %. Meanwhile, the concentration of hydrogen peroxide is preferably 1 to 20 mass % and is more preferably, for example, 5 mass %.

Although examples of the composition and concentrations of the aqueous solution to be used in the pickling treatment were mentioned above, the aqueous solution should not be construed as being limited to those. For example, an aqueous hydrofluoric acid solution having the concentration shown above can be used alone in place of the mixed aqueous solution including hydrofluoric acid.

By thus conducting the carbon concentration reduction step S1, even when the carbon concentration at the above-mentioned position exceeds 10 atom %, the carbon concentration at that position can be controlled to 10 atom % or less without fail. Consequently, a separator material 1 for fuel cells which has high conductivity and conductive durability can be reliably produced. The carbon concentration in the outermost surface of the base material 2 which has been pickled in the pickling treatment is preferably, for example, 9 atom % or less and more preferably 8 atom % or less, as stated above.

In the pickling treatment, the temperature of the aqueous mixture solution can be, for example, room temperature. However, it can be regulated in the range of 10 to 90° C. while taking account of treatment rate, etc. The immersion period can be regulated in the range of, for example, from several minutes to tens of minutes, and can be, for example, 5 to 7 minutes. These conditions can be suitably set in accordance with the carbon concentration at a position located at a depth of 10 nm from the outermost surface of the base material 2.

Treatment methods for regulating the carbon concentration at a position located at a depth of 10 nm from the outermost surface of the base material 2 to 10 atom % or less in the carbon concentration reduction step S1 are not limited to the pickling treatment. For example, applicable methods include a method in which heat-treatment is conducted at a temperature of 650° C. or higher in a vacuum ($1.3 \times 10^{-3}$ Pa or lower) to diffuse the carbon into inner portions of the base material 2 and a method in which a layer having a high carbon concentration is physically removed by shot blasting, polishing, etc.

The process according to the present embodiment for producing a separator material for fuel cells can include any steps other than the steps described above arbitrarily.

For example, before the carbon concentration reduction step S1, a rolling/winding step of rolling the material to a desired thickness and winding it into a coil, and a degreasing step of removing the rolling oil (not shown in FIG. 1) may be included.

Furthermore, between the carbon concentration reduction step S1 and the application step S2, a cleaning/drying step (not shown in FIG. 1) of cleaning and drying the base material may be included.

Between the application step S2 and the heat treatment step S3, a drying step (not shown in FIG. 1) of drying the coated surface may be included.

Moreover, after the heat treatment step S3, a correction step (leveling step) (not shown in FIG. 1) of correcting the lengthwise-direction warpage of the base material 2 caused by the heat treatment to flatten it. The correction can be achieved by using a tension leveler, roller leveler, stretcher, or the like. Furthermore, a cutting step of cutting the separator material 1 for fuel cells which has undergone the heat treatment step S3 or the correction step into a given size may be included.

These steps are all optional steps, and can be conducted according to need.

(One Mode of Production of Fuel-Cell Separator)

In the cases when a fuel-cell separator (not shown) is to be produced by using the separator material 1 for fuel cells which has been produced by the process according to the present embodiment for producing a separator material for fuel cells, it is preferred to conduct a press forming step (not shown) of forming, in the produced separator material 1 for fuel cells, gas channels for passing gases therethrough and gas introduction ports for introducing gases into the gas channels.

The forming of the separator material 1 for fuel cells by the press forming step can be conducted by attaching a forming die to form a desired shape (e.g., a forming die for forming gas channels and gas introduction ports) to a known press forming apparatus, followed by pressing. In the case where use of a lubricant is necessary for the forming, the lubricant can be suitably used. In the case of conducting the press forming with using a lubricant, it is preferable that a step for removing the lubricant is conducted after the press forming step.

In the press forming of the separator material 1 for fuel cells, there are cases where the surface mixture layer 3 of titanium oxide and carbon black cannot completely follow the deformations of the base material 2 and a newly-generated surface of the base material 2 is partly exposed. A natural oxidized coating film is formed on the exposed portions. However, in the cases when the corrosion resistance is insufficient, the corrosion resistance of the exposed newly-generated surface can be enhanced by performing a heat treatment in the air after the press forming step.

This heat treatment in the air atmosphere may be performed under such conditions that carbon black combustion is less apt to occur and titanium oxide formation occurs. Such conditions may include, for example, 30 to 60 minutes at lower temperature side (e.g., 200° C. or higher and lower than 350° C.) in the temperature range of 200 to 500° C., and 0.5 to 5 minutes at higher temperature side (e.g., 350° C. or more and 500° C. or less) in that range. The conditions may be suitably regulated as such to perform.

(Another Mode of Production of Fuel-Cell Separator)

The process according to the present invention for producing a separator material for fuel cells may be a process for producing a separator material in which gas channels and gas introduction ports have been formed. In this case, it is desirable that a press forming step (not shown) of forming the gas channels and gas introduction ports is performed before the application step S2.

Specifically, it is, for example, preferred that pure titanium or a titanium alloy is rolled, followed by annealing to produce a base material 2, subsequently the press forming step is conducted, then the carbon concentration reduction step S1 is conducted according to need, the application step S2 is conducted, and then the heat treatment step S3 is conducted. In this case, a degreasing treatment of removing the oily matter adherent to the surface of the base material 2 can be conducted between the press forming step and the carbon concentration reduction step S1.

It is, for example, also preferred that pure titanium or a titanium alloy is rolled, followed by annealing to produce a base material 2, thereafter the carbon concentration reduction step S1 is conducted according to need, subsequently the press forming step is conducted, the application step S2 is conducted, and then the heat treatment step S3 is conducted. In this case, a degreasing treatment of removing the oily matter adherent to the surface of the base material 2 can be conducted between the press forming step and the application step S2.

Example 1

Next, the contents of the present invention are explained in detail with reference to Examples, which produce the effects of the present invention, and Comparative Examples, which do not produce the effects.

(1) Production of Specimens

[Base Material]

As a base material, a cold-rolled material of pure-titanium (Class 1 as defined in JIS H 4600) having a thickness of 0.1 mm was used and it was cut into a size of 50×150 mm for the use.

The base material used was examined by XPS analysis for carbon concentration at a position located at a depth of 10 nm from the outermost surface of the base material. As a result, it was found to be 18 atom % (the average carbon concentration in the region ranging from 5 to 50 nm in terms of depth from the outermost surface was also 18 atom %). The pickling treatment shown below was hence conducted, and the following steps were further conducted to thereby produce specimens (specimens Nos. 2 to 8). One which had undergone no pickling treatment was also produced as a comparative specimen (specimen No. 1).

[Pickling Treatment]

As a pickling treatment solution was prepared an aqueous mixture solution containing 5 mass % nitric acid and 0.5 mass % hydrofluoric acid. The base material cut into a size of 50×150 mm was subjected to an immerse treatment in this aqueous mixture solution at room temperature for 5 to 7 minutes to remove a high-carbon-concentration region in the outermost surface of the base material, followed by rinsing with water, ultrasonic cleaning, and drying.

The base material thus treated was examined by XPS analysis for carbon concentration at a position located at a depth of 10 nm from the outermost surface thereof. As a result, it was found to be 5 atom % or less (the average carbon concentration in the region ranging from 5 to 50 nm in terms of depth from the outermost surface was also 5 atom %).

[Application of Carbon Black Dispersion Coating Material]

As a coating material containing carbon black dispersed therein, use was made of a commercial coating material (Aqua Black-162, manufactured by Tokai Carbon Co., Ltd.). This coating material was suitably diluted with distilled water and ethanol and applied on the base material by a brush application to produce specimens differing in application amount.

As the measurement of the application amount, it was determined by first measuring the mass of the specimen after the application, subsequently removing the coating material by water washing, followed by drying, thereafter measuring the mass of the specimen, and dividing the difference by the surface area of the specimen.

[Heat Treatment]

After the coating material had been applied to the surface of the base material, specimens of 20×50 mm were cut out therefrom. These specimens were heat-treated under the partial oxygen pressures, at temperatures, and for periods shown in Table 1 to produce specimens. This heat treatment was conducted by using a vacuum heat treatment furnace, and the partial oxygen pressure was regulated by regulating the degree of vacuum.

The contact resistance value of each specimen which had just been thus produced (indicated by "Initial" in Table 1) and the contact resistance value after a durability test were measured in the following manners.

[Measurement of Initial Contact Resistance Value]

Figure 3:
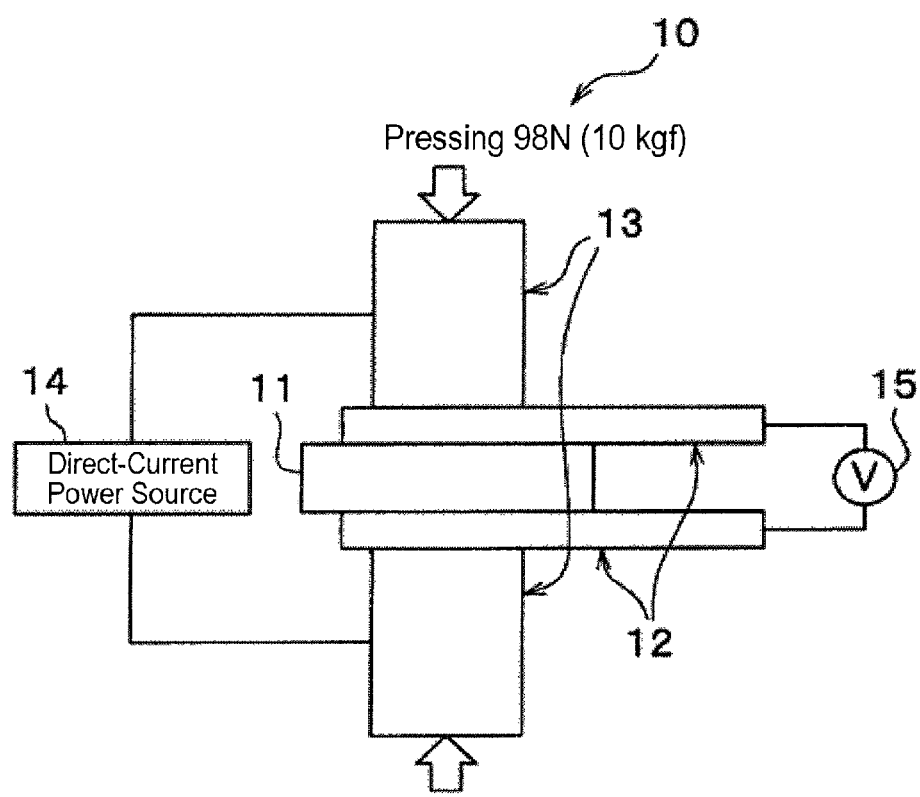
FIG. 3 is a diagrammatic view which illustrates a situation where a specimen is examined for contact resistance value.

Each specimen produced was examined for contact resistance by using the contact resistance measuring device 10 illustrated in FIG. 3. Specifically, the specimen 11 was sandwiched from both sides between carbon cloths 12 (CC6 Plain, manufactured by Fuel Cell Earth; thickness, 26 mils), and this assemblage was further sandwiched from outside between two copper electrodes 13 each having a contact area of 1 cm$^2$, followed by pressing at a load of 98 N (10 kgf). A current of 7.4 mA was caused to flow therethrough by using a direct-current power source 14, and the voltage applied between the carbon cloths 12 was measured with a voltmeter 15 to determine the initial contact resistance value. In the case where the initial contact resistance value was 15 mΩ·cm$^2$ or less, the conductivity was regarded as good (acceptable). In the case where the initial contact resistance value exceeded 15 mΩ·cm$^2$, the conductivity was regarded as poor (unacceptable).

[Measurement of Contact Resistance Value after Durability Test]

Whether the initial contact resistance (conductivity) was maintained in a high-temperature acidic atmosphere was determined in the following manner.

Each specimen was immersed in an 80° C. aqueous sulfuric acid solution (pH 2) to conduct a 200-hour immersion treatment. Thereafter, the specimen was taken out of the aqueous sulfuric acid solution, rinsed and dried, and examined for contact resistance in the similar manner as described above. In the case where the contact resistance after this durability test was 30 mΩ·cm$^2$ or less, the durability was regarded as good (acceptable). In the case where the contact resistance after the durability test exceeded 30 mΩ·cm$^2$, the durability was regarded as poor (unacceptable).

(2) Evaluation of the Specimens

Whether the pickling treatment was performed or not, the carbon black application amount, heat treatment conditions (partial oxygen pressure (Pa), temperature (° C.) and period (min)), and initial and after-durability-test contact resistance values with respect to each specimen are summarized in Table 1.

As shown in Table 1, in the case of specimen No. 1, in which the base material had not been subjected to a pickling treatment, the coating material containing carbon black dispersed therein was applied in the state where a layer containing a large amount of carbon was formed on the base material surface. Because of this, specimen No. 1 was unacceptable with respect to the contact resistance value after durability test. Namely, specimen No. 1 gave results in which the conductive durability was low.

Specimen No. 2 had undergone the heat treatment using too high a partial oxygen pressure, although the base material had been subjected to a pickling treatment. Because of this, the initial contact resistance value thereof was unacceptable. Namely, specimen No. 2 gave results in which the conductivity was low.

Meanwhile, specimens Nos. 3 to 8 had been treated under contents satisfying the requirements specified in the present invention. The initial and after-durability-test contact resistance values were hence acceptable. Namely, specimens Nos. 3 to 8 were ascertained to have high conductivity and conductive durability.

Example 2

(1) Production of Specimen

As a base material, a cold-rolled material of pure-titanium (Class 1 as defined in JIS H 4600) having a thickness of 0.1 mm was used and it was cut into a size of 50×150 mm for the use.

The base material to be used was produced by regulating a rolling reduction rate per pass during rolling to 5 to 8% or less. This base material was examined by XPS analysis for carbon concentration at a position located at a depth of 10 nm from the outermost surface thereof. As a result, it was found to be 6 atom % (the average carbon concentration in the region ranging from 5 to 50 nm in terms of depth from the outermost surface was also 6 atom %). Because of this, a specimen (specimen No. 9) was produced without performing a pickling treatment.

Application of a carbon black dispersion coating material to the specimen and a heat treatment were conducted in the same manners as in Example 1. A measurement of initial contact resistance value and a measurement of contact resistance value after durability test were also made in the same manners using the same criteria for acceptance as in Example 1.

TABLE 1

| Specimen No. | Pickling treatment | Carbon black application amount (μg/cm$^2$) | Heat treatment conditions | | | Contact resistance value (mΩ · cm$^2$) | | Remarks |
| | | | Partial oxygen pressure (Pa) | Temperature (° C.) | Period (min) | Initial | After durability test | |
| --- | --- | --- | --- | --- | --- | --- | --- | --- |
| 1 | not performed | 3.6 | 0.1333 | 500 | 30 | 7.5 | 2790 | Comparative Example |
| 2 | performed | 3.6 | 26.66 | 500 | 30 | 40.2 | 51.3 | Comparative Example |
| 3 | performed | 3.6 | 0.1333 | 500 | 30 | 8.7 | 25.6 | Example |
| 4 | performed | 3.6 | 0.1333 | 700 | 1 | 4.1 | 6.4 | Example |
| 5 | performed | 3.6 | 0.0667 | 700 | 1 | 4.9 | 28.4 | Example |
| 6 | performed | 6.5 | 0.1333 | 700 | 2 | 4.6 | 5.3 | Example |
| 7 | performed | 11.2 | 0.1333 | 750 | 1 | 3.3 | 9.1 | Example |
| 8 | performed | 11.2 | 0.2667 | 700 | 2 | 3.5 | 3.9 | Example |

(2) Evaluation of the Specimen

Whether the pickling treatment was performed or not, the carbon black application amount, heat treatment conditions (partial oxygen pressure (Pa), temperature (° C.) and period (min)), and initial and after-durability-test contact resistance values with respect to specimen No. 9 are summarized in Table 2.

The base material after the pickling treatment was examined by XPS analysis for carbon concentration at a position located at a depth of 10 nm from the outermost surface thereof. As a result, it was found to be 5 atom % or less (the average carbon concentration in the region ranging from 5 to 50 nm in terms of depth from the outermost surface was also 5 atom %).

TABLE 2

| Specimen No. | Pickling treatment | Carbon black application amount (μg/cm²) | Heat treatment conditions | | | Contact resistance value (mΩ · cm²) | | Remarks |
|---|---|---|---|---|---|---|---|---|
| | | | Partial oxygen pressure (Pa) | Temperature (° C.) | Period (min) | Initial | After durability test | |
| 9 | not performed | 11.2 | 0.2667 | 700 | 1 | 3.2 | 28.2 | Example |

Table 2 shows the following. In specimen No. 9, the carbon concentration at a position located at a depth of 10 nm from the outermost surface of the base material was within the range specified in the present invention. Because of this, the measurement of the initial contact resistance value and the contact resistance value after durability test were acceptable, although the base material had not been subjected to a pickling treatment. Namely, specimen No. 9 was ascertained to have high conductivity and conductive durability.

Example 3

(1) Production of Specimens

[Base Material]

The same pure-titanium base material as described in Example 1, in which the carbon concentration at a position located at a depth of 10 nm from the outermost surface of the base material was 18 atom %, was cut into a size of 50×150 mm and used.

[Pickling Treatment]

The same aqueous mixture solution of nitric acid and hydrofluoric acid as in Example 1 was used to conduct a pickling treatment, thereby removing a high-carbon-concentration region in the outermost surface of the base material.

[Application of Carbon Black Dispersion Coating Material]

The same carbon black dispersion coating material as in Example 1 was suitably diluted and used to produce several specimens differing in application amount.

[Heat Treatment]

The specimens to which the carbon black dispersion coating material had been applied were atmosphere-heat-treated in argon gas atmospheres to which oxygen gas had been added. The atmospheres respectively had oxygen gas concentrations of 50 ppm, 100 ppm, 200 ppm, and 300 ppm; the partial oxygen pressures therein are calculated at 5.07 Pa, 1013 Pa, 20.27 Pa, and 30.40 Pa, respectively.

The heat treatment was conducted at a temperature of 650° C. for a period of 5 minutes or 10 minutes. Thus, specimens Nos. 10 to 15 were produced.

[Measurement of Initial and after-Durability-Test Contact Resistance Values]

A measurement of initial contact resistance value and a measurement of contact resistance value after durability test were also made in the same manners using the same criteria for acceptance as in Example 1.

(2) Evaluation of the Specimens

Whether the pickling treatment was performed or not, the carbon black application amount, heat treatment conditions (partial oxygen pressure (Pa), temperature (° C.) and period (min)), and initial and after-durability-test contact resistance values with respect to each of specimens Nos. 10 to 15 are summarized in Table 3.

TABLE 3

| Specimen No. | Pickling treatment | Carbon black application amount (μg/cm²) | Heat treatment conditions | | | Contact resistance value (mΩ · cm²) | | Remarks |
|---|---|---|---|---|---|---|---|---|
| | | | Partial oxygen pressure (Pa) | Temperature (° C.) | Period (min) | Initial | After durability test | |
| 10 | performed | 15.5 | 5.07 | 650 | 10 | 3.6 | 5.8 | Example |
| 11 | performed | 15.5 | 10.13 | 650 | 10 | 5.2 | 7.3 | Example |
| 12 | performed | 15.5 | 20.27 | 650 | 5 | 6.5 | 12.3 | Example |
| 13 | performed | 18.3 | 20.27 | 650 | 10 | 8.9 | 15.6 | Example |
| 14 | performed | 15.5 | 30.40 | 650 | 5 | 18.3 | 35.2 | Comparative Example |
| 15 | performed | 18.3 | 30.40 | 650 | 10 | 38.6 | 45.2 | Comparative Example |

Table 3 shows the following. In specimens Nos. 10 to 13, the partial oxygen pressures in the atmospheres during the heat treatment were within the range specified in the present invention. Because of this, the measurement of the initial contact resistance values and the contact resistance values after durability test were acceptable. Namely, specimens Nos. 10 to 13 were ascertained to have high conductivity and conductive durability.

Meanwhile, in specimens Nos. 14 and 15, the partial oxygen pressure in the atmosphere during the heat treatment was higher than the range specified in the present invention. Because of this, the initial contact resistance values and the contact resistance values after durability test were unacceptable.

Figure 4:
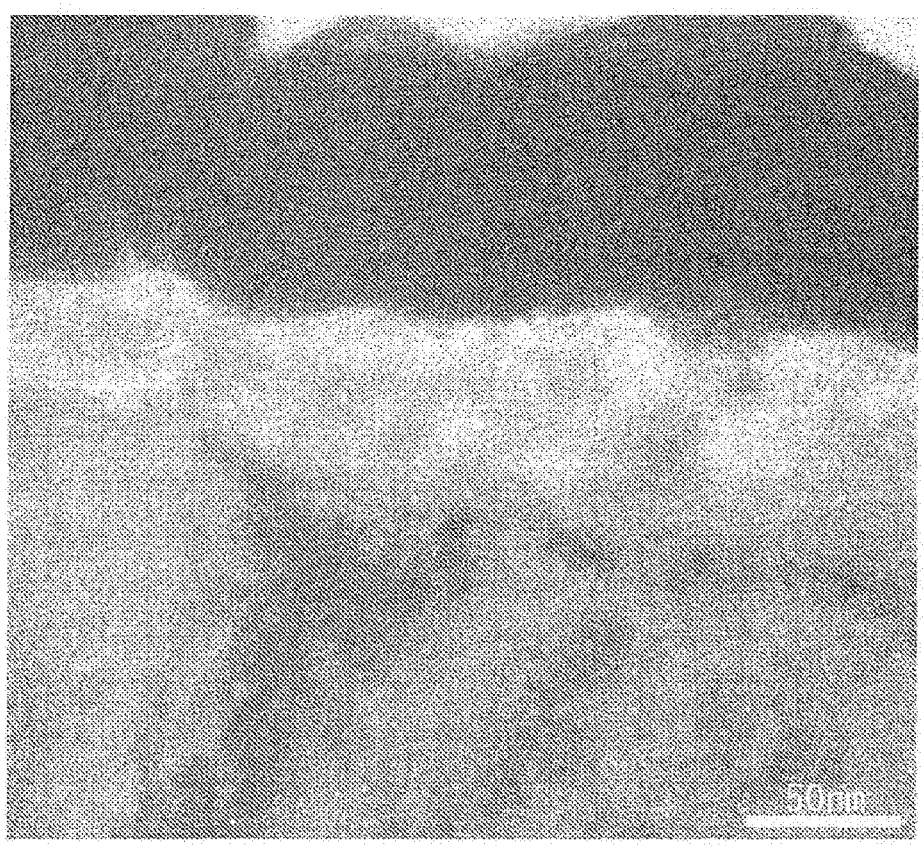
FIG. 4 is a TEM photograph obtained by photographing a cross-section of sample No. 8.

In FIG. 4 is shown a TEM photograph obtained by photographing a cross-section of sample No. 8. It can be seen that a layer having a thickness of 50 to 100 nm has been formed on the titanium base material, and that light portions have been intermingled with dark portions in terms of the contrast in the layer. The light portions and the dark portions were subjected to compositional analysis by EDX (energy dispersive X-ray spectroscopy) and, as a result, it was found that the light portions contain carbon in a large amount. These portions are thus presumed to be carbon black. Meanwhile, when the dark portions were similarly subjected to the compositional analysis, titanium and oxygen were detected. These portions were subjected to state analysis by nano-electron beam diffraction and, as a result, it was found that crystalline rutile is contained. From these results, it can be seen that a mixture layer containing titanium oxide and carbon black intermingled therewith has been formed on the titanium base material.

While the present invention has been described in detail and with reference to specific embodiments thereof, it will be apparent to one skilled in the art that various changes and modifications can be made therein without departing from the spirit and scope of the present invention.

The present application is based on a Japanese patent application filed on May 28, 2014 (Application No. 2014-110588) and a Japanese patent application filed on Dec. 26, 2014 (Application No. 2014-265269), the contents thereof being incorporated herein by reference.

INDUSTRIAL APPLICABILITY

According to the present invention, it is possible to produce a separator material for fuel cells which has high conductivity and conductive durability to greatly contribute to performance improvements in fuel cells.

DESCRIPTION OF THE REFERENCE NUMERALS AND SIGNS

S1 Carbon concentration reduction step
S2 Application step
S3 Heat treatment step
1 Separator material for fuel cell
2 Base material
3 Mixture layer

The invention claimed is:

1. A process for producing a separator material, the process comprising:
applying carbon black to a surface of a base material comprising pure titanium or a titanium alloy and having a carbon concentration of 10 atom % or less at a position located at a depth of 10 nm from an outermost surface of the base material; and
subsequently subjecting the base material to a heat treatment in an atmosphere having a partial oxygen pressure of 0.0667 Pa or more and 25 Pa or less so that a layer which is not TiC is formed.

2. The process according to claim 1, further comprising:
before the applying, subjecting the surface of the base material to a carbon concentration reduction treatment so that carbon concentration at the position located at the depth of 10 nm from the outermost surface is 10 atom % or less.

3. The process according to claim 2, wherein the carbon concentration reduction treatment is a pickling treatment of pickling the base material in an acidic aqueous solution comprising hydrofluoric acid.

4. The process according to claim 1, wherein the heat treatment is conducted at a partial oxygen pressure of 0.0667 Pa or more and 21 Pa or less and in a temperature range of 300 to 800° C.

5. A separator material, comprising:
a base material comprising pure titanium or a titanium alloy, and
a mixture layer formed on a surface of the base material and comprising a mixture of carbon black and titanium oxide yielded by an oxidation of some or all of titanium atoms diffused outward from the base material,
wherein a mass ratio of the titanium oxide to the carbon black in a cross-sectional area of the mixture layer is from 1:9 to 8:2.

6. The process according to claim 2, wherein the heat treatment is conducted at a partial oxygen pressure of 0.0667 Pa or more and 21 Pa or less and in a temperature of 300 to 800° C.

7. The process according to claim 3, wherein the heat treatment is conducted at a partial oxygen pressure of 0.0667 Pa or more and 21 Pa or less and in a temperature of 300 to 800° C.

8. The separator material according to claim 5, further comprising:
a layer of carbon black on the mixture layer.

9. The separator material according to claim 5, wherein the mixture layer does not comprise titanium carbide.

10. The process according to claim 1, wherein the heat treatment is performed at a partial oxygen pressure of 0.0667 Pa or more and 20 Pa or less and at a temperature of 500 to 750° C.

11. The process according to claim 1, wherein the heat treatment is performed at 500° C. for 30 minutes.

12. The process according to claim 1, wherein the heat treatment is performed at 700° C. for 1 to 2 minutes.

13. The process according to claim 1, wherein, after the heat treatment, a second heat treatment in air atmosphere is performed.

14. The process according to claim 1, wherein the carbon black is a powder having a particle diameter of 20 to 200 nm.

15. The process according to claim 14, wherein an amount of the carbon black powder applied to the surface of the base material is 1 to 50 µg/cm$^2$.

16. The process according to claim 14, wherein an amount of the carbon black powder applied to the surface of the base material is 2 to 50 µg/cm$^2$.

* * * * *